(12) United States Patent
Shuster

(10) Patent No.: US 7,899,703 B2
(45) Date of Patent: Mar. 1, 2011

(54) METHOD AND APPARATUS FOR PROVIDING INTERNET ADVERTISING SERVICE

(76) Inventor: Brian Mark Shuster, Stateline, NV (US)

( * ) Notice: Subject to any disclaimer, the term of this patent is extended or adjusted under 35 U.S.C. 154(b) by 1873 days.

(21) Appl. No.: 09/860,839

(22) Filed: May 16, 2001

(65) Prior Publication Data

US 2002/0019771 A1 Feb. 14, 2002

Related U.S. Application Data

(60) Provisional application No. 60/204,722, filed on May 16, 2000.

(51) Int. Cl.
 *G06Q 30/00* (2006.01)
(52) U.S. Cl. .......................... 705/14; 705/10
(58) Field of Classification Search .................... 705/14
 See application file for complete search history.

(56) References Cited

U.S. PATENT DOCUMENTS

| | | | | |
|---|---|---|---|---|
| 4,531,023 A | * | 7/1985 | Levine | 379/93.02 |
| 5,754,938 A | * | 5/1998 | Herz et al. | 725/116 |
| 5,774,869 A | * | 6/1998 | Toader | 705/10 |
| 6,009,150 A | * | 12/1999 | Kamel | 379/88.22 |
| 6,128,651 A | | 10/2000 | Cezar | |
| 6,161,127 A | | 12/2000 | Cezar et al. | |
| 6,373,930 B1 | * | 4/2002 | McConnell et al. | 379/114.28 |
| 6,663,105 B1 | * | 12/2003 | Sullivan et al. | 273/138.2 |

OTHER PUBLICATIONS

"Gaining ground on a giant" by Carroll, Kelly and Quinton, Brian, Telephony v237n8 pp. 8, 10 Aug. 23, 1999 DIALOG(R)File 15, Record # 01898399.*
Rosano, Paul. For Inside Scoop, ESPN Worth A Try. Oct. 17, 1999. Hartford Courant. p. E.9.*
Internet Archives WayBack Machine. Printouts for espn.go.com website from Jan. 25, 1999, Apr. 21, 1999, and May 8, 1999.*
Goldsmith, Jack L. Fall 1998. Against Cyberanarchy. University of Chicago Law Review. v65n4. pp. 1199-1250. Issn: 0041-9494. Journal Code: UCL.*
Internet Archives Way Back Machine printout of http://www.valupage.com from Dec. 3, 1998.*
Becker, Ingrid. Advertising and Marketing; Paid Per View; Online Marketers Are Rewarding Users Just for Looking at Ads. Nov. 6, 1997. pp. 4.*

* cited by examiner

Primary Examiner—Namrata Boveja
(74) Attorney, Agent, or Firm—Knobbe Martens Olson & Bear, LLP

(57) ABSTRACT

A method and apparatus for providing advertising service in a computer network is provided. This method and apparatus further comprises receiving a request from a user via this computer network to view a Web page, providing conditions to the user for viewing this Web page, delivering this Web page to the user, determining if the user has met the conditions required for viewing this Web page, and terminating access of the user to this Web page if these conditions are not met.

15 Claims, 3 Drawing Sheets

METHOD AND APPARATUS FOR PROVIDING INTERNET ADVERTISING SERVICE

CROSS-REFERENCE TO RELATED APPLICATION

This application claims priority pursuant to 35 U.S.C. §119 (e) to U.S. Provisional Application No. 60/204,722, filed May 16, 2000, which application is specifically incorporated herein, in its entirety, by reference.

BACKGROUND OF THE INVENTION

1. Field of the Invention

The present invention relates to a method and apparatus for providing Internet advertising service. More specifically, this invention relates to the implementation of a timer mechanism which increases both the number of visitors to a sponsor website and the quality of those particular visits.

2. Description of Related Art

For many years, the global retail market has been characterized as a market in which physical products are sold from physical locations. In recent years, however, this dynamic has undergone a significant change in response to the increasing popularity of the Internet and in particular with the increasing popularity of advertising on the Internet. It should be appreciated that the Internet is defined here as a collection of interconnected (public and/or private) networks linked together by a set of standard protocols (such as TCP/IP and HTTP) to form a global, distributed network. While this term is intended to refer to what is now commonly known as the Internet, it is also intended to encompass variations which may be made in the future, including changes and additions to existing standard protocols.

Many websites are supported by business models that rely heavily if not entirely on generating revenue from the sale of advertising. In particular, these websites are paid by sponsors according to the number of clicks made by website visitors on these sponsor advertisements. Therefore, a decline in the number of clicks a particular sponsor advertisement receives directly translates to a loss in revenue for the host website. As the Internet becomes increasingly more commercial though, these websites are having a more difficult time selling advertisements due to a substantial reduction in a website visitor's willingness to click on these advertisements. A primary reason for this reluctance is the simple fact that website advertisements are now so common. Moreover, as website visitors become more aware of particular types of advertisements they are much more inclined to ignore them.

A further problem exists in that all clicks on a sponsor's advertisement are not equally valuable to that sponsor. In general, the greater the amount of time a visitor spends on a sponsor website, the more valuable that visitor becomes to the sponsor. A need in the industry therefore exists to create an incentive for website visitors to not only click on a sponsor's advertisement, but then, once they have been sent to that sponsor's website, to spend enough time on that sponsor's website to evaluate the offer being presented by that particular advertisement. In this way, the sponsor can realize the maximum value from each click and thus receive what is commonly known in the industry as "high quality traffic". Furthermore, the advertising website can charge the sponsor a higher price for its advertisement space as the website continually receives this higher quality traffic.

SUMMARY OF THE INVENTION

In an embodiment of the invention, a method and apparatus for providing advertising service in a computer network is provided. This method and apparatus further comprises receiving a request from a user via this computer network to view a Web page, identifying the user, providing conditions to the user for viewing this Web page, delivering this Web page to the user, determining if the user has met the conditions required for viewing this Web page, and terminating access of the user to this Web page if these conditions are not met.

A more complete understanding of a method and apparatus for providing Internet advertising service will be afforded to those skilled in the art, as well as a realization of additional advantages and objects thereof, by a consideration of the following detailed description of the preferred embodiment. Reference will be made to the appended sheets of drawings which will first be described briefly.

DETAILED DESCRIPTION OF THE PREFERRED EMBODIMENT

The present invention is directed towards a method and apparatus for providing Internet advertising service. In particular, this invention fulfills the need to create an incentive for website visitors to visit sponsor advertisements and, once they have been sent to that sponsor's website, spend enough time on that sponsor's website to evaluate the offer being presented by that particular advertisement. As a result, this invention enables advertiser websites to create higher quality traffic for its sponsors.

In a preferred embodiment, an advertiser website is equipped with an online timer tool which determines the time at which a visitor first enters the website. It should be appreciated that this online timer may be embodied by any of a plurality of Internet applications (e.g., Java applet) without changing the scope and spirit of the present invention. Upon entering the advertiser website, the timer tool will begin a count-down from a pre-determined time period. In one preferred embodiment, a graphical display of the time remaining appears on the user's Web browser. At any point during the user's visit to the website, they may visit a sponsor website by clicking on that particular sponsor's advertisement located on the advertiser's website. If the user does not click on a participating sponsor's advertisement before the time elapses, the website will disappear for that particular user, and in its place, a new website is displayed, which website will consist exclusively of links to participating sponsors and a notice that the user must visit one of the sponsors' websites in order to refill its timer and regain access to normal contents of the website.

Figure 1:
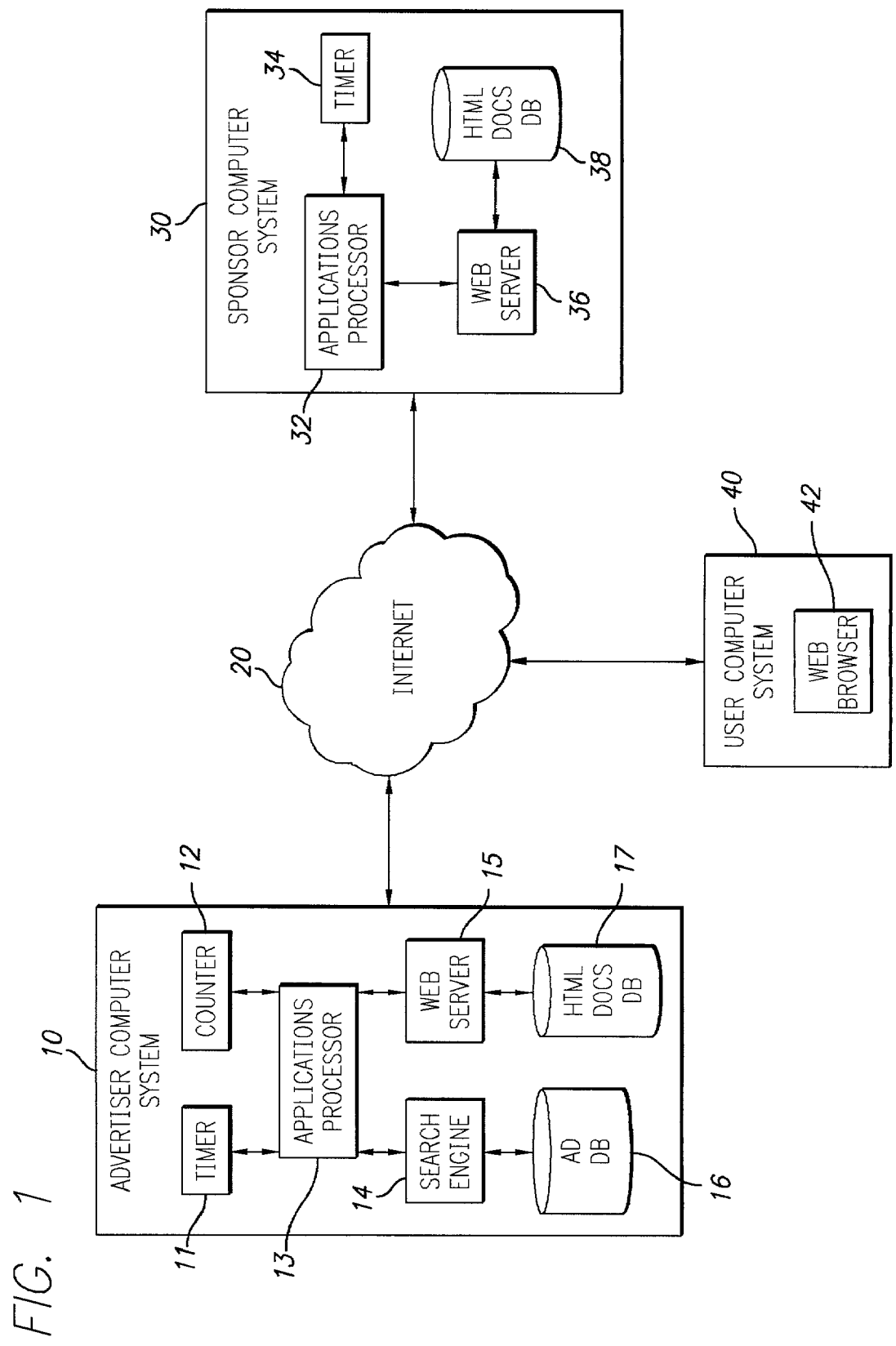
FIG. 1 is a block diagram demonstrating a preferred embodiment of the invention.

In FIG. 1, a block diagram is illustrated of a wide area network employing a method and apparatus according to an embodiment of the invention. It is anticipated that the present invention operates with a plurality of computers which are coupled together on a wide area network, such as the Internet 20, or other communications network. As illustrated, an advertiser computer system 10 is shown to communicate with sponsor computer systems 30 and user computer systems 40 via the Internet 20. It should be appreciated that user computers 40 may include any type of computing device that allows a user to interactively browse websites, such as a personal computer (PC) that includes a Web browser application 42 (e.g., Microsoft Internet Explorer™ or Netscape Communicator™). Suitable user computers 40 equipped with browsers 42 are available in many configurations, including handheld devices (e.g., PalmPilot™), personal computers (PC), laptop computers, workstations, television set-top devices, multi-functional cellular phones, and so forth.

The advertiser computer system 10 is shown to be further comprised of an applications processor 13 coupled to a timer 11, a counter 12, a search engine 14 connected to a advertisement database 16, and a Web server 15 connected to an HTML (Hyper-Text Markup Language) documents database 17. Meanwhile, the sponsor computer system 30 is shown to be further comprised of an applications processor 32 coupled to a timer 34 and a Web server 36 connected to an HTML documents database 38.

As is generally known in the art, search engines such as search engine 14 typically incorporate a database engine, such as a SQL Server™ engine from Microsoft Corporation or Oracle™ database engine, as part of their architecture. It is also well known in the art that such search engines typically perform searches by operating on a string of characters, known as a "query string." A query string is coded according to a set of rules determined by the database engine and/or a user interface between the database engine and the user. As used herein, a "query" is broader than a "query string," denoting both the query string and the search logic represented by the query string, whereas "query string" refers only to a string of characters, symbols, or codes used to define a query.

As is also generally known in the art, Web servers such as Web servers 15 and 36 access a plurality of Web pages, distributable applications, and other electronic files containing information of various types respectively stored in HTML document databases 17 and 38. As a result, Web pages may be viewed on various user computers 40; for example, a particular Web page or other electronic file may be viewed through a suitable application program residing on a user computer 40, such as a browser 42, or by a distributable application provided to the user computer 40 by Web server 15 or 36. It should be appreciated that many different user computers, many different Web servers, and many different search servers of various types may be communicating with each other at the same time.

It should be further appreciated that a user identifies a Web page that is desired to be viewed at the user computer 40 by communicating an HTTP (Hyper-Text Transport Protocol) request from the browser application 42. The HTTP request includes the Uniform Resource Locator (URL) of the desired Web page, which may correspond to an HTML document stored in the HTML documents databases 17, 38. The HTTP request is routed to the Web servers 15, 36 via the Internet 20. The Web servers 15, 36 then retrieve the HTML document identified by the URL, and communicate the HTML document across the Internet 20 to the browser application 42. The HTML document may be communicated in the form of plural message packets as defined by standard protocols, such as the Transport Control Protocol/Internet Protocol (TCP/IP).

Figure 2:
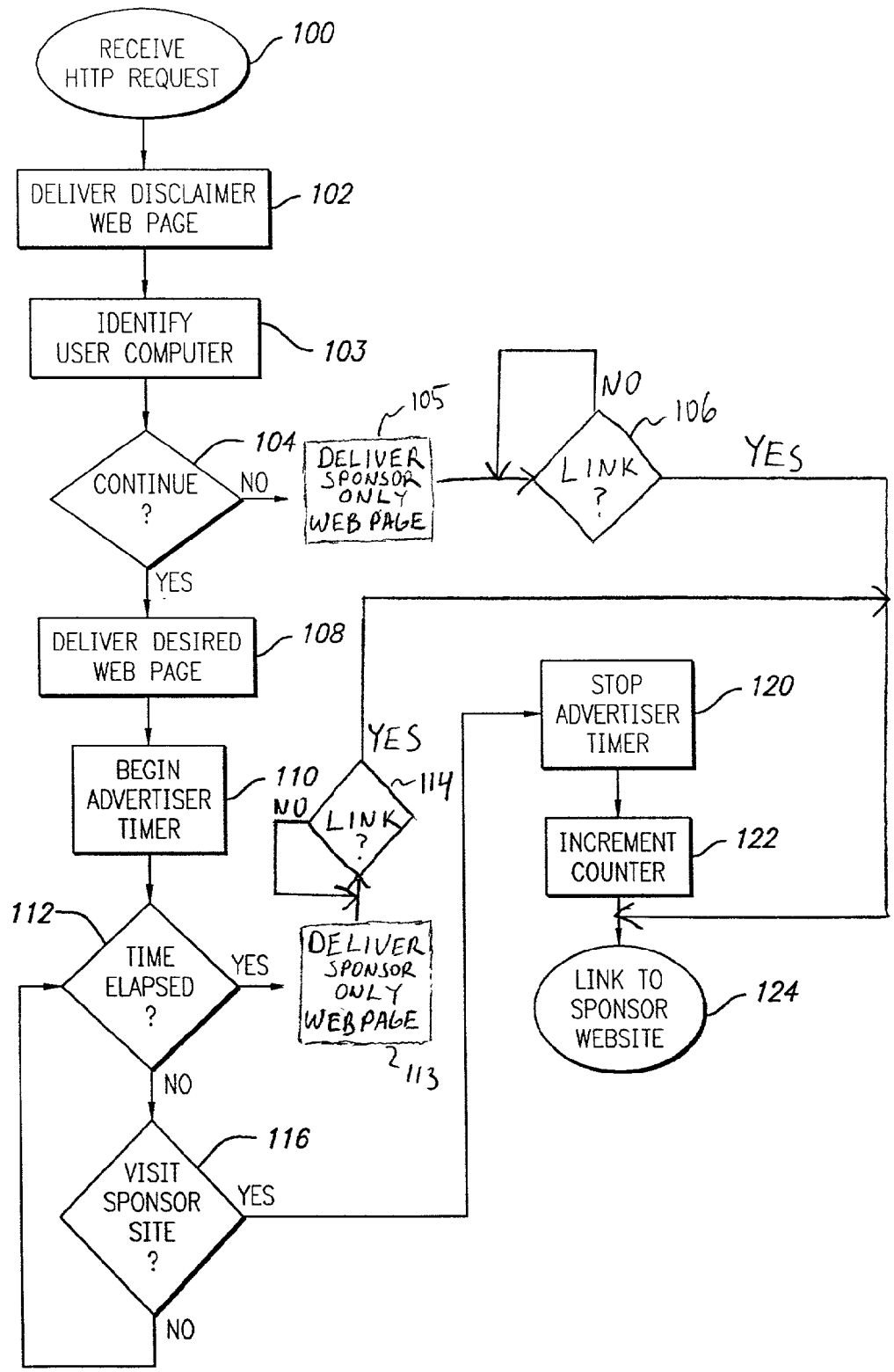
FIG. 2 is a flow chart outlining the operation of advertiser computer systems according to a preferred embodiment of the invention.

In FIG. 2, a flow chart outlining the operation of advertiser computer systems according to a preferred embodiment of the invention is shown. This procedure begins at step 100 when the advertiser computer system 10 receives an HTTP request from the user computer system 40. At step 102, the advertiser computer system 10 then delivers a disclaimer Web page to the user computer system 40 explaining how the user must visit a sponsor website before a certain amount of time expires, otherwise, its session with this particular website will be terminated. The user computer system 40 is then identified by the advertiser computer system 10 at step 103. At step 104, the advertiser computer system 10 must next determine whether to grant access to this website depending on the past history of this particular user. More specifically, the advertiser computer system 10 must determine whether the user has recently attempted to visit the advertiser website without meeting the conditions set forth in the disclaimer web page. It should be appreciated that this determination shall be made by the manager's of the advertiser computer system 10. If access is indeed granted at step 104, then the desired Web page is delivered to the user computer system 40 at step 108; otherwise, another Web page, consisting of only sponsor advertisement links, is delivered to the user at step 105. It should be appreciated that the advertiser computer system 10 will not allow a user to return to the original advertiser Web page until it determines that the user has selected one of the sponsor links displayed on the "sponsor-only" Web page at step 106. Therefore, if at step 106 the advertiser computer system detects an attempt to link to a sponsor website, then the user is linked to that particular sponsor website at step 124; otherwise, the advertiser computer system continues to await this user link selection at step 106.

Once the desired Web page has been delivered to the user at step 108, the advertiser computer system 10 begins its timer 11 at step 110. The advertiser computer system 10 then continually checks if a predetermined amount of time has elapsed at step 112. It should be appreciated that this length of time can be any length of time deemed appropriate by the managers of the advertiser computer system 10. If this length of time has indeed elapsed at step 112, then the previously described "sponsor-only" Web page is again delivered to the user at step 113 followed by a determination of whether the user has linked to one of advertisements displayed on the "sponsor-only" Web page at step 114 (where step 114 has the same behavior as previously described step 106); otherwise, the advertiser computer system 10 determines whether the user has linked to a sponsor website from the originally delivered Web page at step 116.

If the user links to one of these sponsor websites at step 116, then the advertiser computer system 10 stops its timer at step 120; otherwise, the advertiser computer system continues to check if time has elapsed on timer 11 at step 112. After stopping the timer 11 at step 120, the advertiser computer system 10 increments the counter 12 at step 122, then links the user to the sponsor computer system 30 at step 124.

Figure 3:
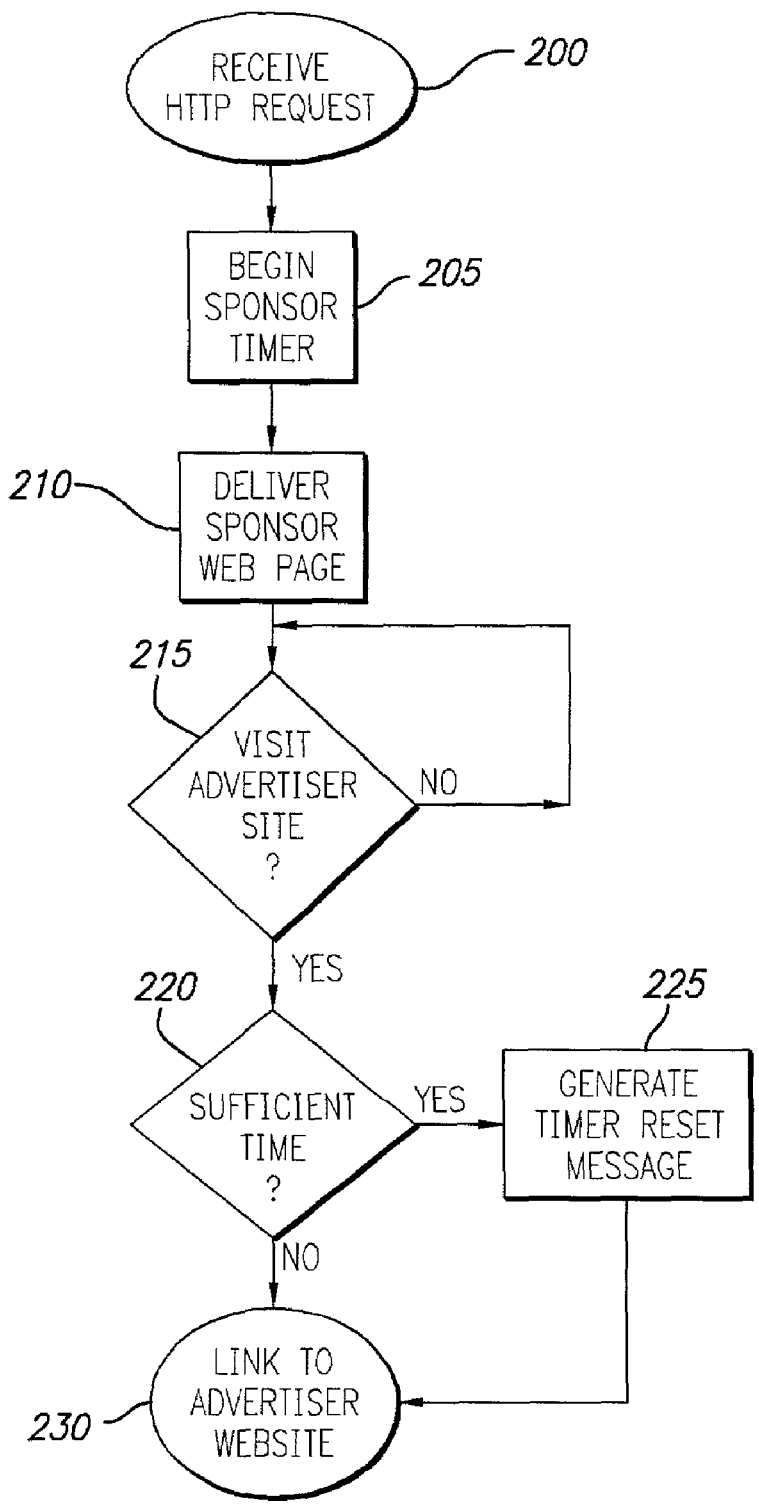
FIG. 3 is a flow chart outlining the operation of sponsor computer systems according to a preferred embodiment of the invention

Once the user visits the sponsor website at step 124, another timing procedure is initiated by the sponsor computer system 30. In FIG. 3, this procedure is summarized in a flow chart beginning with the sponsor computer system 30 receiving an HTTP request at step 200. The procedure then continues with the sponsor timer 34 being activated at step 205 and the appropriate sponsor Web page being delivered at step 210. The sponsor computer system 30 must then determine whether the user has clicked back to the advertiser website at step 215. If the user does indeed attempt to return to the advertiser website at step 215, then the procedure must next determine whether the amount of time spent on the sponsor's website exceeds the minimum length of time required to reset the timer 11 of the advertiser computer system 10 at step 220; otherwise, the sponsor computer system 30 continues to check if the user attempts to visit the advertiser's website at step 215. If it is determined that this amount of time is sufficient at step 220, then the sponsor computer system proceeds by generating a timer reset verification message at step 225 which is then sent to the advertiser computer system 10 when the user is re-linked at step 230; otherwise, the user is simply returned to the advertiser computer system 30 at step 230 without such message being generated. It should be appreciated that, without this verification, the advertiser timer 11 is not reset and is thus re-activated with the same amount of time it had remaining from before visiting the sponsor website.

In alternative embodiments, timer incentives may be implemented by the advertiser computer system 10 in order to better serve its sponsors. In returning to the advertiser website at step 230 via step 225, for example, a user may be given additional time on its advertiser timer 11 if it made a purchase on the sponsor website. Similarly, a user may be given additional time according to the exceeded time spent on the sponsor website (i.e., time beyond which is required to reset the advertiser timer 11).

In another embodiment, sponsor websites may ally themselves with each other in a manner such that a user could deplete its required time on any combination of visits within a network of multiple sponsor websites. Within this embodiment, all participating websites would be synchronized according to a central timer within the network. This embodiment would thus allow a user to expend a portion of its required time at one sponsor website while expending the remainder of its required time with visits to any combination of the other participating sponsor websites. In this way, a network of websites could ensure that a user visits any combination of certain websites within that network for at least a pre-determined amount of time; otherwise, the entire network is made inaccessible to the user.

In an embodiment of the invention, advertising Web sites may be provided with an applet or other tool that can run within their Web sites' pages, and another applet or tool may be provided to participating sponsors to be run on their Web sites. The advertiser sites' tool may determine the time at which a visitor first enters the Web site. Upon entering a Web site, the applet or tool may begin a count-down for any pre determined time period. A graphical display of the time remaining in the count will may appear on the user's Web browser. At any point during the user's stay on the Web site, he may visit a sponsor by clicking on the sponsor's ad. If the user does not click on a participating sponsor's ad before the count-down completes, the applet may cause the Web site to disappear for that particular user, and in its place, a new Web site may be displayed, which site may consist exclusively of links to participating sponsors and a notice that the user must visit one of the sponsors in order to refill his timer and regain access to the normal contents of the Web site.

Once the user clicks on an appropriate ad and arrives at the sponsor's Web site, the applet on the sponsor's web site may then refresh the user's timer such that the user can return to the advertiser site and resume using the normal content of that web site, with the timer again starting at full time and beginning the cycle of count-down anew.

In an embodiment of the invention, the user may be able to click on an ad from any participating sponsor at any time during the count-down, and thus refresh the counter to provide the full duration of time on the web site, without waiting for the counter to expire and the web site to be replaced with the notification.

In another embodiment of the invention, upon clicking to a participating sponsor's Web site, the count-down may reverse and begin to refresh. The refresh rate may be accelerated from the normal rate of decrement. Thus, for example, a user with a fully depleted timer may need to spend 30 seconds on a sponsor's Web page in order to refresh their timer back to it's maximum capacity, if the user spends less time on the sponsors site than required, he could then return to the advertiser's Web site, but the countdown would start from the reduced duration that had been achieved when departing the sponsor's site before the user had fully recharged his timer. Alternatively, if the user returns before spending a minimum duration on the sponsor's Web site, the tinier may not be recharged at all.

A single timer may be used for more than one advertiser's Web site. Thus, a visitor may visit one participating site for a period of time and deplete the time on their count down by, say 50%, and then surf to a second participating advertiser Web site. In this case, the count down at the second advertiser Web site would begin at 50% depleted, and continue the count down, in this way, a network of Web sites could force a Web surfer to refresh the count down or else the entire network of Web sites would become inaccessible to the suffer.

In another embodiment of the invention, surfers may purchase, or sponsors may offer special, counters that have longer duration or permanent states of recharge based on a purchase of the specially modified applet or on the performance of a specific action by the surfer, such that their existing applet is modified. For example, with any purchase, the applet count-down may be credited with an additional 100 minutes of surfing time.

Having thus described a preferred embodiment of a method and apparatus for providing Internet advertising service, it should be apparent to those skilled in the art that certain advantages of the within system have been achieved. It should also be appreciated that various modifications, adaptations, and alternative embodiments thereof may be made within the scope and spirit of the present invention. The invention is further defined by the following claims.

What is claimed is:

1. A method for providing advertising service in a computer network, comprising:
   receiving a request from a user, via said computer network, to view a Web page;
   in response to receiving the request to view a Web page, providing a condition to said user for viewing said Web page, said condition requiring said user to select for viewing a sponsor site that is linked from said Web page;
   delivering said Web page to said user;
   determining if said user has met said condition; and
   terminating access of said user to said Web page and permitting said user to continue uninterrupted with said user's access to other user-selected content via said computer network, if said condition is not met.

2. The method of claim 1, wherein said step of providing said condition further comprises providing a time period in which said user should select said sponsor site for viewing.

3. The method of claim 1, wherein said step of providing said condition further comprises providing a time period in which said user should purchase a product.

4. The method of claim 2, wherein said step of providing said condition further comprises displaying a timer on said user's computer.

5. The method of claim 2, wherein said step of determining further comprises determining whether said time period has elapsed.

6. The method of claim 5, further comprising halting elapse of said time period if said user selects said sponsor site for viewing.

7. The method of claim 1, further comprising identifying said user's computer and terminating access of said user to said Web page if said condition was not met in a previous session with said Web page.

8. A system for providing advertising service in a computer network, comprising:
- a server connected to said computer network and an advertising management application executing in association with said server to provide the functions of:
  - receiving a request from a user, via said computer network, to view a Web page;
  - in response to receiving the request to view a Web page, providing a condition to said user for viewing said Web page, said condition requiring said user to select for viewing a sponsor site that is linked from said Web page;
  - delivering said Web page to said user;
  - determining if said user has met said condition; and
  - terminating access of said user to said Web page and permitting said user to continue uninterrupted with said user's access of other user-selected content via said computer network, if said condition is not met.

9. The system of claim 8, wherein said function of providing said condition further comprises providing a time period in which said user should select said sponsor site for viewing.

10. The system of claim 8, wherein said function of providing said condition further comprises providing a time period in which said user should purchase a product.

11. The system of claim 9, wherein said function of providing said condition further comprises displaying a timer on said user's computer.

12. The system of claim 9, wherein said function of determining further comprises determining whether said time period has elapsed.

13. The system of claim 12, further comprising halting elapse of said time period if said user selects said sponsor site for viewing.

14. The system of claim 8, further comprising identifying said user's computer and terminating access of said user to said Web page if said condition was not met in a previous session with said Web page.

15. A method for providing advertising service in a computer network, comprising:
- receiving a request from a user, via said computer network, to view a Web page;
- in response to receiving the request to view a Web page, providing a condition to said user for viewing said Web page, said condition requiring said user to select for viewing a sponsor site within a first time period and view the sponsor site for at least a second time period;
- delivering said Web page to said user;
- determining if said user has met said condition; and
- terminating access of said user to said Web page and permitting said user to continue uninterrupted with said user's access of other user-selected content via said computer network, if said condition is not met.

* * * * *